(12) United States Patent (10) Patent No.: US 8,717,915 B2
Dubut et al. (45) Date of Patent: May 6, 2014

(54) PROCESS-INTEGRATED TREE VIEW CONTROL FOR INTERACTIVE VOICE RESPONSE DESIGN

(75) Inventors: Frédéric Dubut, Zurich (CH); William LeFevre, Woodinville, WA (US); Kelly Rollin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 815 days.

(21) Appl. No.: 12/786,856

(22) Filed: May 25, 2010

(65) Prior Publication Data

US 2011/0293077 A1 Dec. 1, 2011

(51) Int. Cl.
*H04L 12/26* (2006.01)
*H04L 12/66* (2006.01)
*H04M 11/00* (2006.01)

(52) U.S. Cl.
USPC .................. 370/252; 370/356; 379/88.18

(58) Field of Classification Search
None
See application file for complete search history.

(56) References Cited

U.S. PATENT DOCUMENTS

| | | | |
|---|---|---|---|
| 6,982,708 B1* | 1/2006 | Mah et al. ............... | 345/418 |
| 7,065,188 B1* | 6/2006 | Mei et al. ............... | 379/88.23 |
| 7,215,743 B2 | 5/2007 | Creamer et al. | |
| 7,515,695 B1* | 4/2009 | Chan et al. ............. | 379/88.18 |
| 7,680,683 B2 | 3/2010 | Hilerio et al. | |
| 2006/0245557 A1 | 11/2006 | Paden et al. | |
| 2008/0065668 A1 | 3/2008 | Spence et al. | |
| 2009/0154666 A1 | 6/2009 | Rios et al. | |
| 2010/0104075 A1* | 4/2010 | Wang ..................... | 379/88.18 |

OTHER PUBLICATIONS

Green, David., "Building Applications on a Workflow Platform", Retrieved at << http://msdn.microsoft.com/en-us/library/bb245670.aspx >>, Retrieved Date: Mar. 23, 2010, pp. 1.
"Enterprise Europe Network", Retrieved at << http://www.enterpriseeuropenetwork.at/stakeholder/index.php?file=bbs-show.php&bbsref=05%20IT%20ONCA%20ODLA >>, Jan. 4, 2006, pp. 3.

* cited by examiner

*Primary Examiner* — Melanie Jagannathan
(74) *Attorney, Agent, or Firm* — Steven Spellman; Leonard Smith; Micky Minhas

(57) ABSTRACT

An Interactive Voice Response (IVR) system design approach is provided employing a dynamic form that evolves automatically as the user enters content, in order to provide visual guidance relative to possible subsequent steps in the IVR system. The dynamic form follows a tree-view structure for the responses. The IVR content may be entered directly into the tree-view structure in an ad hoc manner, which provides a streamlined experience to the user compared to segmented building blocks.

20 Claims, 8 Drawing Sheets

PROCESS-INTEGRATED TREE VIEW CONTROL FOR INTERACTIVE VOICE RESPONSE DESIGN

BACKGROUND

Interactive Voice Response (IVR) is an integral part of many telecommunications solutions, which allow callers to access specific information by interacting with an answering automaton through Dual Tone Multi-Frequency (DTMF) keypad input or voice recognition. Some of the typical usages of IVR include call distribution in a call center or direct access to information such as telebanking, airlines, etc.

In order to provide a satisfactory caller experience, parameters such as what questions are asked by the system, what user input is expected, how the user input is interpreted, how the automaton reacts to user input, etc. may be considered in IVR design. The IVR design process is a challenging one. Generic approaches may increase the risk of design flaws, while restrictive approaches may limit the design to basic patterns. For example, a basic call routing and queuing solution based on a static form where the IVR creator can enter simple questions and answers may be easy to understand, but can be restrictive in terms of design parameters. On the other hand, an application enabling the IVR creator to design visually a state-based workflow with various building blocks (message, decision, etc) may be flexible and powerful, but may require a significant learning curve and lack general guidance relative to the subsequent steps in the design process.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to an Interactive Voice Response (IVR) system design employing a dynamic form that evolves automatically as the user enters content, in order to provide visual guidance relative to possible subsequent steps in the IVR system. According to some embodiments, the dynamic form may follow a tree-view structure for the responses. The IVR content may be entered directly into the tree-view structure in an ad hoc manner, which may provide a streamlined experience to the user compared to segmented building blocks.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
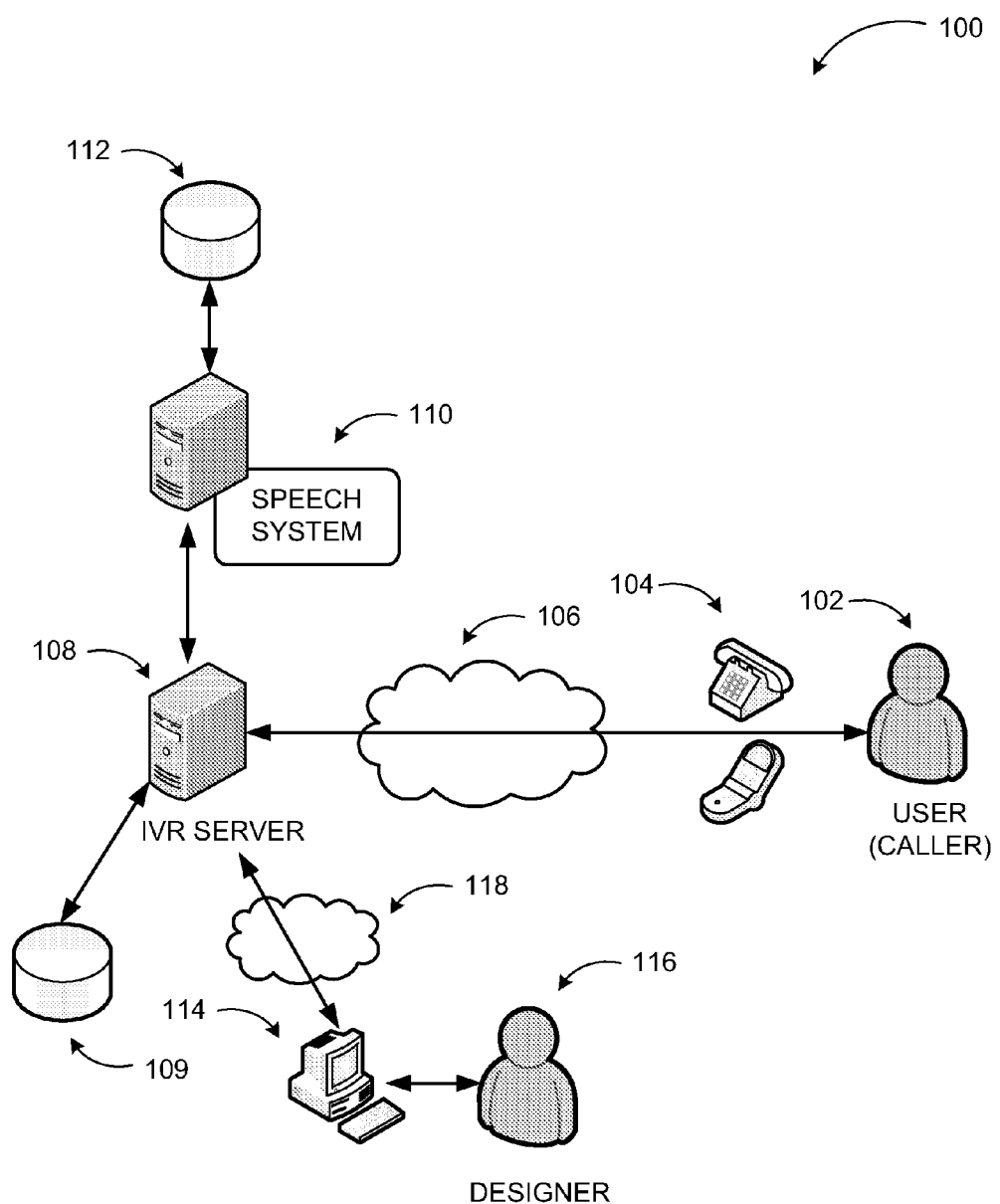
FIG. 1 is a conceptual diagram illustrating an IVR system.

As briefly described above, an IVR system may be designed employing a dynamic form that evolves automatically as the user enters content, in order to provide visual guidance relative to possible subsequent steps in the IVR system. The dynamic form may follow a tree-view structure for entering and displaying the responses at design time. The IVR content may be entered directly into the tree-view structure in an ad hoc manner to provide a streamlined experience to the user compared to segmented building blocks. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing design and operation of an IVR system. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Referring to FIG. 1, conceptual diagram 100 illustrating an example IVR system is provided. The networked communication environments shown in diagram 100 are for illustration purposes. Embodiments may be implemented in various networked environments such as public networks, enterprise-based networks, cloud-based networks, and combinations of those.

In an IVR system such as the one shown in diagram 100, an IVR application is executed by IVR server 108. Callers (e.g. user 102) may access the IVR application through any form of audio communication such as a cellular call, a Public Switched Telephone Network (PSTN) call, a Voice over Internet Protocol (VOIP) call, and similar ones. The audio communication may be established through an audio communication device 104 associated with user 102 over one or more networks 106.

IVR server 108 may interact with a speech system 110 executed by one or more servers. The speech system 110 may store and provide pre-recorded or synthesized audio responses, prompts, etc. Data associated with the speech synthesis portion of the IVR system such as pre-recorded or synthesized audio files may be stored in data store 112. IVR data store 109 may be employed to store prompts and designed IVR structure accessible by the IVR server 108 and client device 114. Designer 116 may access the IVR application at IVR server 108 through a client device 114 over one or more networks 118 and set up design parameters before or during operation of the IVR system. Networks 106 and 118 may be different networks (e.g. network 106 an audio communication network and network 118 a data network) or the same network (e.g. both data networks).

The IVR system may employ a number of servers such as communication servers, audio servers, database servers, and comparable ones. Client device 114 may be any computing device such as a laptop computer, a handheld computer, a desktop computer, a vehicle mount computer, a smart phone, and similar ones. Networks 106 may include a cellular network, a PSTN network, a data network capable of facilitating VOIP or similar audio communications, and comparable ones. Audio communication device may be a telephone, a cellular phone, a smart phone, a computer executing an application providing audio communications, etc.

The example system in FIG. 1 has been described with specific servers, client devices, applications, and interactions. Embodiments are not limited to systems according to these example configurations. A platform providing process-integrated tree-view control for IVR design may be implemented in configurations employing fewer or additional components and performing other tasks. Furthermore, specific protocols and/or interfaces may be implemented in a similar manner using the principles described herein.

Figure 2:
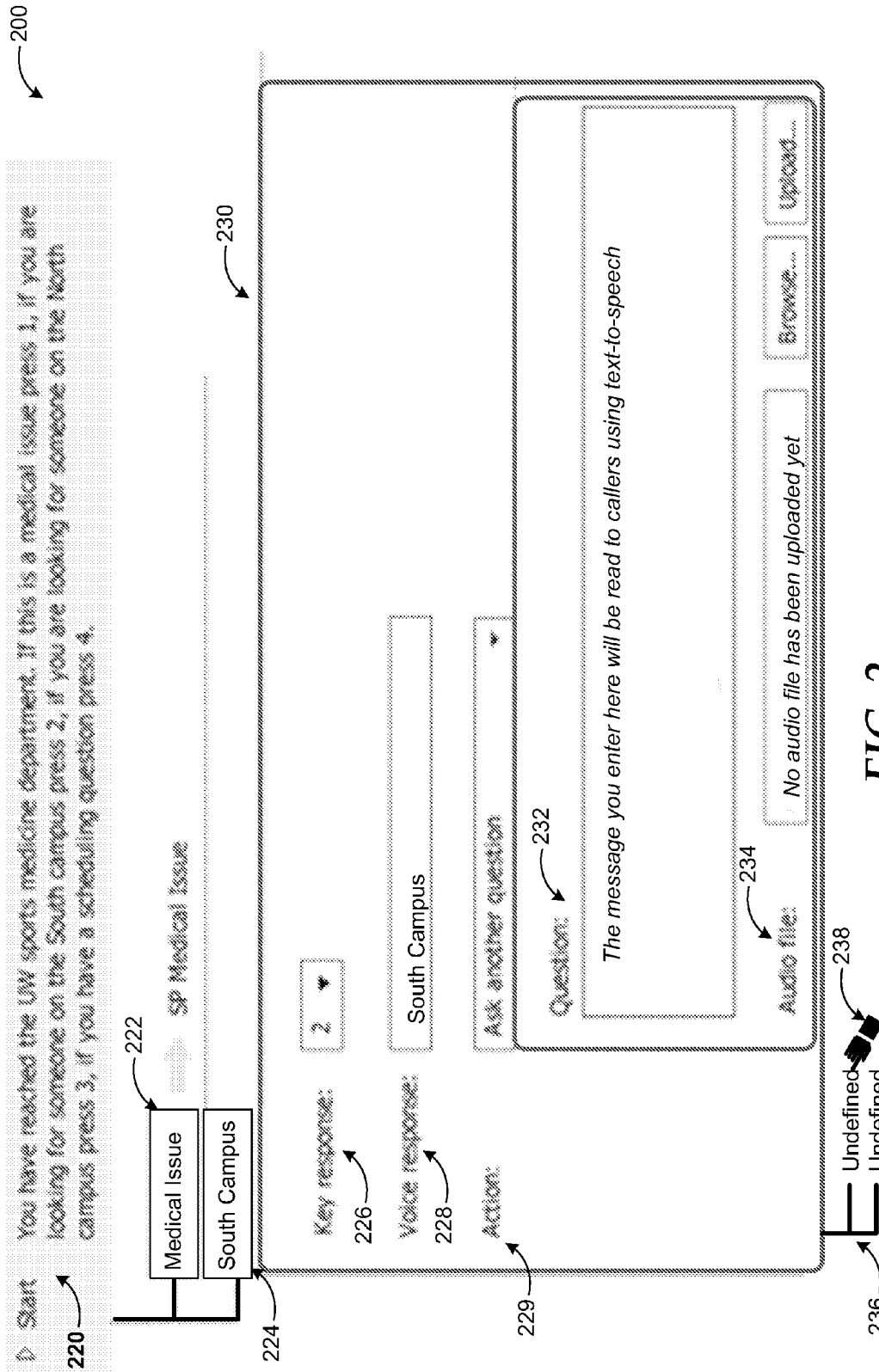
FIGS. 2 through 4 illustrate screenshots of an example IVR system design application user interface with different aspects of IVR design being provided to a user for selection or modification according to embodiments.
Figure 3:
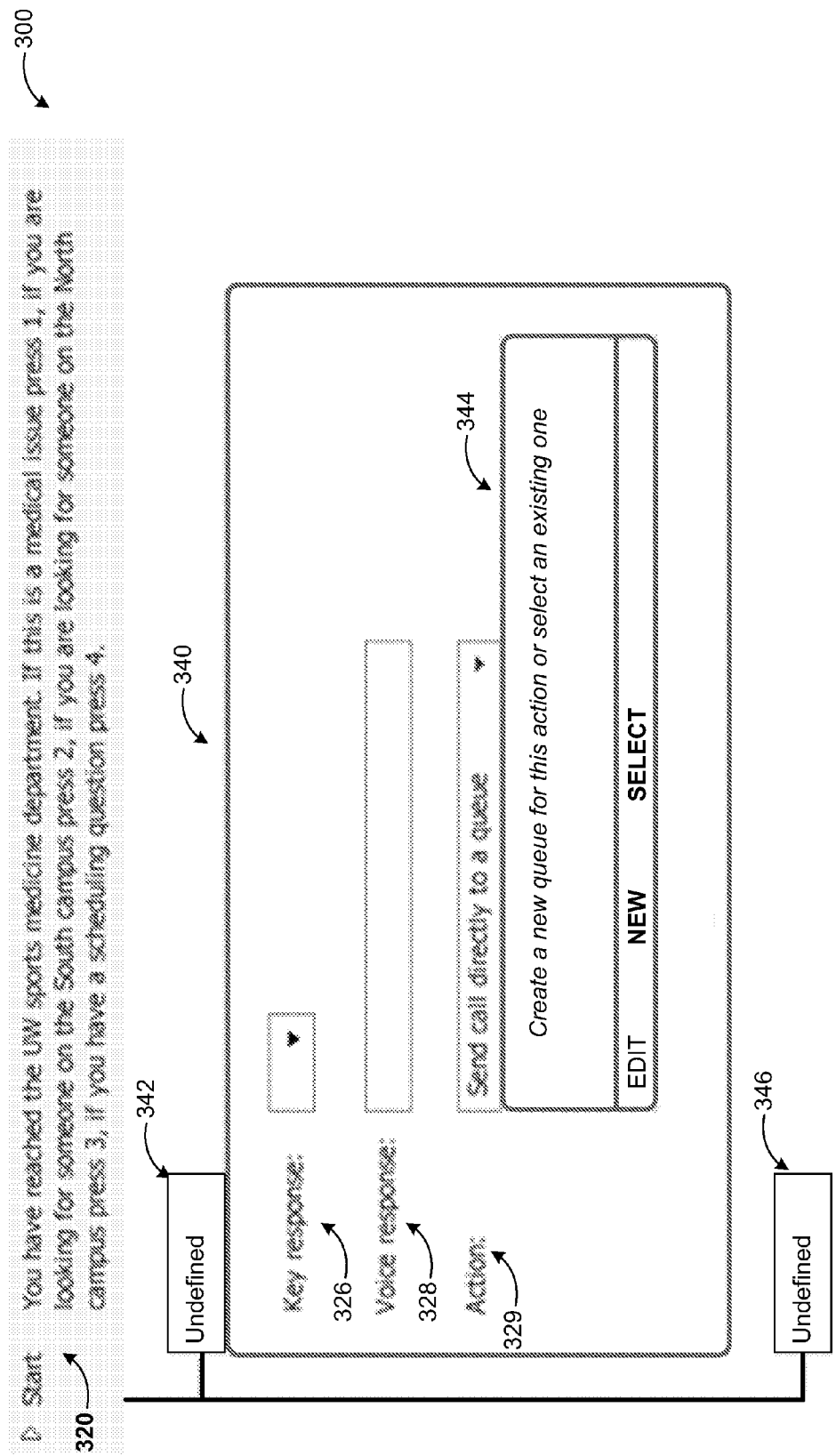
Figure 4:
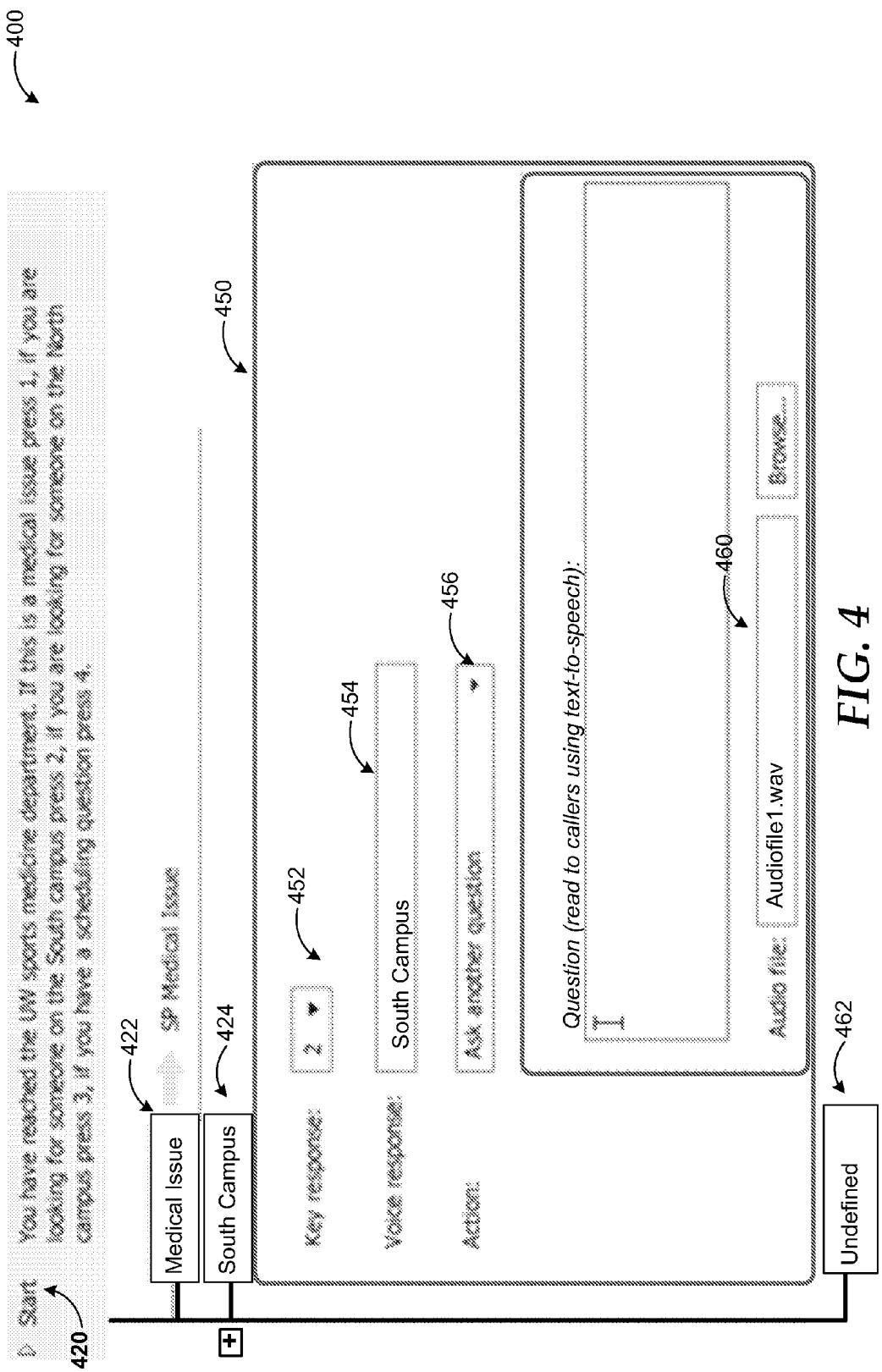

FIGS. 2 through 4 illustrate screenshots of an example IVR system design application user interface with different aspects of IVR design being provided to a user for selection or modification according to embodiments.

An IVR design system according to some embodiments may employ a tree-view structure, which evolves automatically as entries are provided by the designer. Each node in the structure may be expanded and/or collapsed to show or hide an inline form, where the user can enter content for a particular node (e.g. a voice prompt for a question). In contrast, conventional IVR systems typically separate dialogs from the IVR structure and need an extra action such as double-clicking or right-clicking to access the form for a given node.

Thus, in an IVR design system according to embodiments, the IVR content is entered directly in the main tree view, resulting in a more user friendly and streamlined experience. As the form for specifying actions and prompts is located directly in the tree, the user can easily replace the currently edited node in a more general context. Moreover, several nodes may be expanded at the same time making it easier to fill content relative to the other nodes. In addition, the IVR tree-view node structure evolves automatically based on the content entered in the individual node form. For example, if the user enters a multi-choice question as node content, two or more child nodes corresponding to the possible question's answers may be added automatically to the control. This way, the final IVR design may be less error-prone, since only the allowed options are proposed to the user. Flaws in the IVR may be identified rapidly, as invalid nodes (e.g. empty answer nodes) can be marked as such. Furthermore, an overall experience may be improved and made easier as the user is guided in the design by the actual tree-view structure. As such, the user does not have to select every single node among a set of many possible building bricks.

Referring to screenshot 200 of FIG. 2, an example IVR design user interface is provided employing the tree-view structure. The structure begins with a root node 220 presenting an initial audio prompt that is to be played to the callers when they reach the IVR system. Based on the start message of the root node 220, there are four nodes in the tree-view structure: "medical issue" node 222, "south campus" node 224, and nodes for "north campus" and "scheduling question" options (not shown) listed in the root node.

The first node, "medical issue" node 222 is a queuing node directing callers to a call queue and indicated as such (with the arrow) on the user interface providing a designer context. Callers may be prompted a question or directed to a queue of agents, a Session Initiation Protocol Universal Resource Identifier (SIP URI), a telephone number, or a voicemail, and receiving a complex caller input.

Form 230 is an example form for enabling the designer to make entries for "south campus" node 224. The example entries may include key response 226 specifying which DTMF key entry by a caller is associated with the "south campus" node 224. "Voice Response" 228 specifies a voice based caller response that is to be associated with the node (south campus) to be used in conjunction with voice recognition. "Voice Response" 228 entry may also be used as an identifier of "south campus" node 224. In form 230, a designer may also be enabled to select an action 229 associated with "south campus" node 224. Action 229 may include a drop-down menu selection of possible actions such as "Ask another question". If the designer selects the "Ask another question" action, question box 232 may be provided to enable the designer to type in the question to be played to a caller if they select "south campus" option during the IVR's operation. Alternatively, the designer may be enabled to select an audio file 234 to be played by searching through a directory of existing audio files or uploading the audio file.

If action 229 selected by the designer is a question, nodes 236 may be automatically created and displayed to the designer as "unidentified" such that the designer can select any one of the two unidentified nodes (238), specify them and provide content in a similar manner. In response to the designer's selection, current form 230 may be collapsed and a form similar to form 230 may be displayed enabling the designer to enter prompt parameters within the context of the overall tree-view structure for the IVR. The graphic display of the structure and self-explanatory identification of items in the tree-view structure may guide the designer through the steps of creating and combining various branches of the IVR system.

Example screenshot 300 of FIG. 3 illustrates a step in the IVR design process following the designer's selection of one of the unidentified child nodes in the screenshot of FIG. 2. After selection of the first child node 342 in the previous step, the "medical issue" and "south campus" parent nodes may be collapsed into the root node 320 and form 340 displayed for specifying content associated with "unidentified" node 342. The designer may assign a voice recognitions based response associated with the node, which may automatically become the name if the node, through "Voice Response" 328, select an action 329 to be performed in association with this child node, and specify (DTMF) key response 326 as described above.

The example screenshot 300 shows an alternative action for child node 342 "Send call directly to a queue" 344. This action may place the caller in a queue for talking to a real person, and thus not require an expected response. Screenshot 300 also shows the sibling node 346, which is still unidentified. As discussed above, if an action requiring one or more responses is selected by the designer, nodes corresponding to each expected response may be added automatically to the tree-view structure such that the designer can configure those nodes as well.

Example screenshot 400 of FIG. 4 returns to the screenshot of FIG. 2 with some different features. On the screenshot 400, root node 420 and "medical issue" node 422 are shown as in FIG. 2. In the tree-view structure, one more of the four first level nodes is shown as "unidentified" node 462 connected to the root node as with the other first level nodes. The child nodes of "south campus" node 424 are collapsed into their parent node and indicated graphically. As shown in form 450 associated with the second node, the voice response for the node is still "south campus" 454 and the selected action is "Ask another question" 456 with DTMF key response 452 (DTMF key 2). Differently from FIG. 2, in this example screenshot, the designer has selected to specify an audio file (460) to be played to a caller if this node is reached during an operation of the IVR.

In the configuration screens of FIGS. 2, 3, and 4, various textual, graphical, coloring, and shading schemes may be employed to accentuate different elements of the user interface, indicate acceptable vs. unacceptable options, provide information associated with different options, and so on. Furthermore, additional parameters associated with each node of the IVR structure such as wait times for caller responses may be specified.

Figure 5:
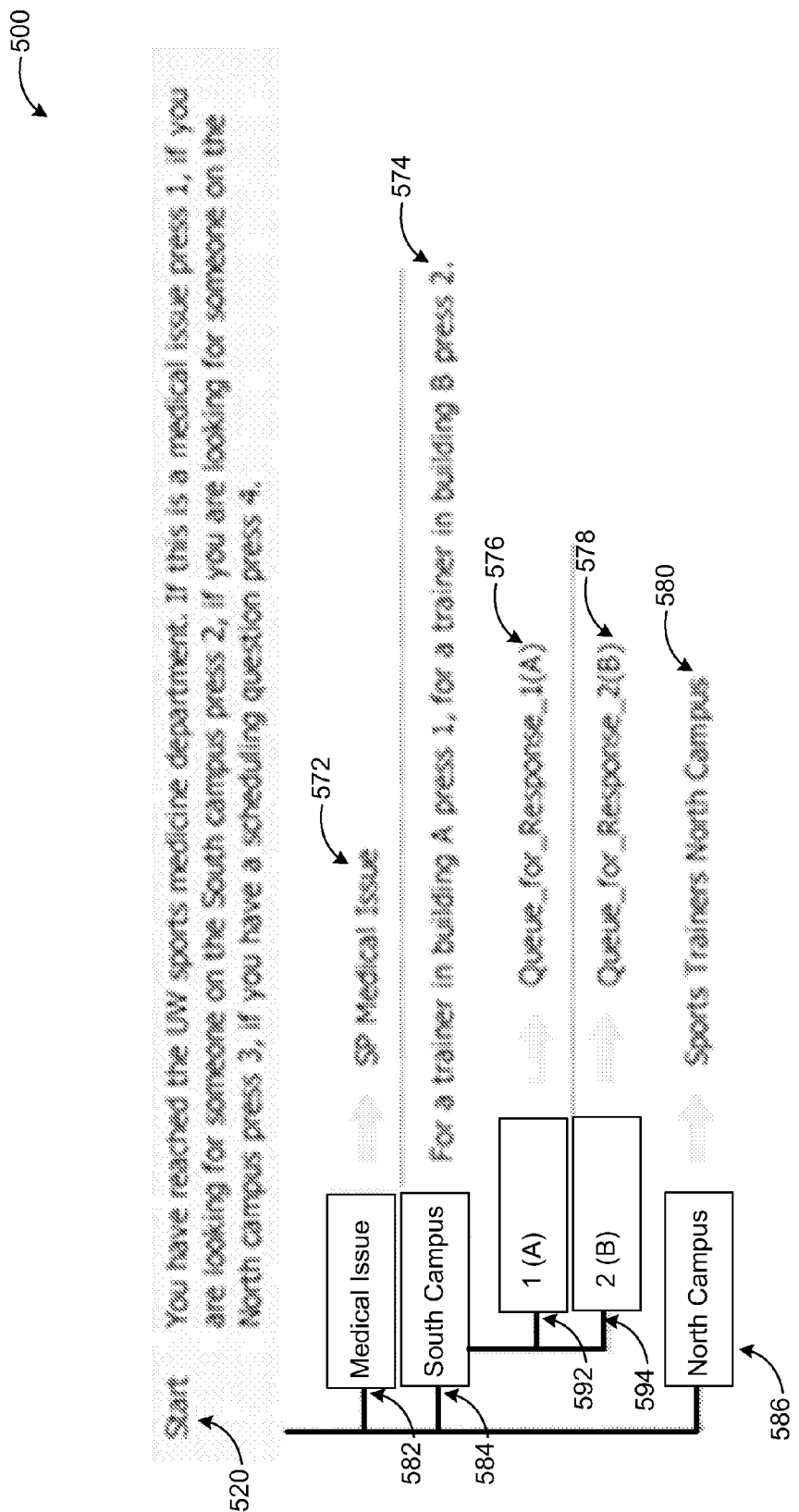
FIG. 5 illustrates an example screenshot of an IVR system design application user interface displaying user created branches of the IVR system.

FIG. 5 illustrates an example screenshot of an IVR system design application user interface displaying user created branches of the IVR system. When configuring the content of a given node, a designer may choose, directly at the current node, a subsequent step among the possible choices (e.g. sending the call to a queue of agents, configuring an additional question, or receiving complex user input). This choice may in turn cause the tree-view structure to evolve in the same way as the root node adding new unidentified sub-nodes to the current node (e.g. corresponding to the answers of the question). When the IVR is completely configured, the nodes may be collapsed in order to trigger a summary view as shown in example screenshot 500 instead of a full content view when the nodes are expanded.

The summary for each node may depend directly on the content of the node and provide concrete information about the current step. For example, prompts configured using text-to-speech technology may be displayed directly as part of the node, while transfers to queues may be displayed using the queue name. In screenshot 500, under the root node 520, first level nodes "medical issue" 582, "south campus" 584, and "north campus" 586 are shown. For "south campus" 584, the text prompt 574 corresponding to the audio prompt to be played to the callers is displayed next to the node. Nodes "medical issue" 582, "north campus" 586, "1(A)" 592, and "2(B)" 594 are directed to call queues "SP Medical Issue" 572, "Sports Trainers North Campus" 580, "Queue for Response 1(A)" 576, and "Queue for Response 2(B)" 578, respectively.

In addition to the textual clues in the user interface, graphical elements such as icons indicating different types of actions for each node (text-to-speech prompt, pre-recorded file, call queue, etc.) may also be displayed. Furthermore, textual, graphic, coloring, and shading schemes as discussed above may also be employed to enhance visual experience with the summary view of the IVR tree-view structure.

The examples in FIG. 2 through FIG. 5 have been described with specific user interface elements, configurations, and presentations. Embodiments are not limited to systems according to these example configurations. An IVR design system user interface may be implemented in configurations using other types of user interface elements, presentation schemes, and configurations in a similar manner using the principles described herein. Furthermore, embodiments are not limited to IVR systems. Indeed embodiments may be implemented in system, where a parent object's data dictates the structure or format of the child objects and guidance is provided to users in the creation of the tree structure. In such systems, an overall summary or 'big picture' may be as important as the details of the individual nodes. If knowledge of or interaction with other nodes in the tree is important or helpful to the creation or editing of a specific node, a form-based structured design approach walking a designer through the nodes may be employed.

Figure 6:
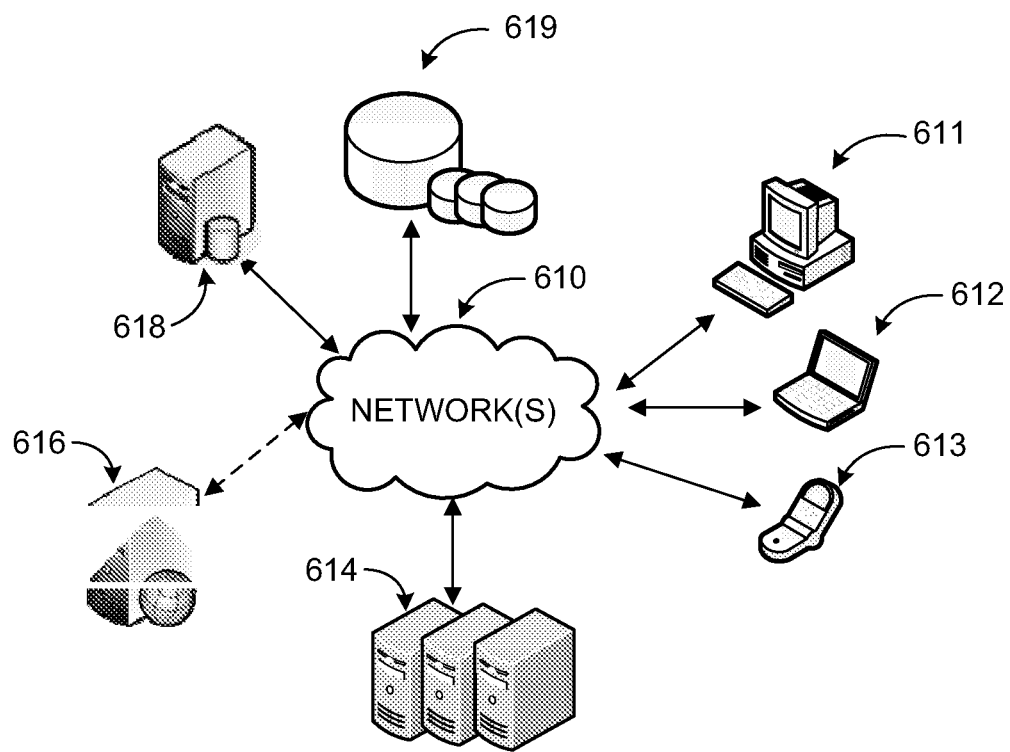
FIG. 6 is a networked environment, where a system according to embodiments may be implemented.

FIG. 6 is an example networked environment, where embodiments may be implemented. An IVR design system may be implemented via software executed over one or more servers 614 such as a hosted service. The platform may communicate with client applications on individual computing devices such as a smart phone 613, a laptop computer 612, or desktop computer 611 ('client devices') through network(s) 610.

Client applications executed on any of the client devices 611-613 may facilitate communications via application(s) executed by servers 614, or on individual server 616. An IVR design application executed on one of the servers may facilitate setting up initial parameters, call/response flows, and other aspects of an IVR system, and provide visual feedback through the tree-view structure as discussed previously. The IVR application may retrieve relevant data from data store(s) 619 directly or through database server 618, and provide requested services to the user(s) through client devices 611-613.

Network(s) 610 may comprise any topology of servers, clients, Internet service providers, and communication media. A system according to embodiments may have a static or dynamic topology. Network(s) 610 may include secure networks such as an enterprise network, an unsecure network such as a wireless open network, or the Internet. Network(s) 610 may also coordinate communication over other networks such as Public Switched Telephone Network (PSTN) or cellular networks. Furthermore, network(s) 610 may include short range wireless networks such as Bluetooth or similar ones. Network(s) 610 provide communication between the nodes described herein. By way of example, and not limitation, network(s) 610 may include wireless media such as acoustic, RF, infrared and other wireless media.

Many other configurations of computing devices, applications, data sources, and data distribution systems may be employed to implement a platform providing organizational behavior monitoring and modification services. Furthermore, the networked environments discussed in FIG. 6 are for illustration purposes only. Embodiments are not limited to the example applications, modules, or processes.

Figure 7:
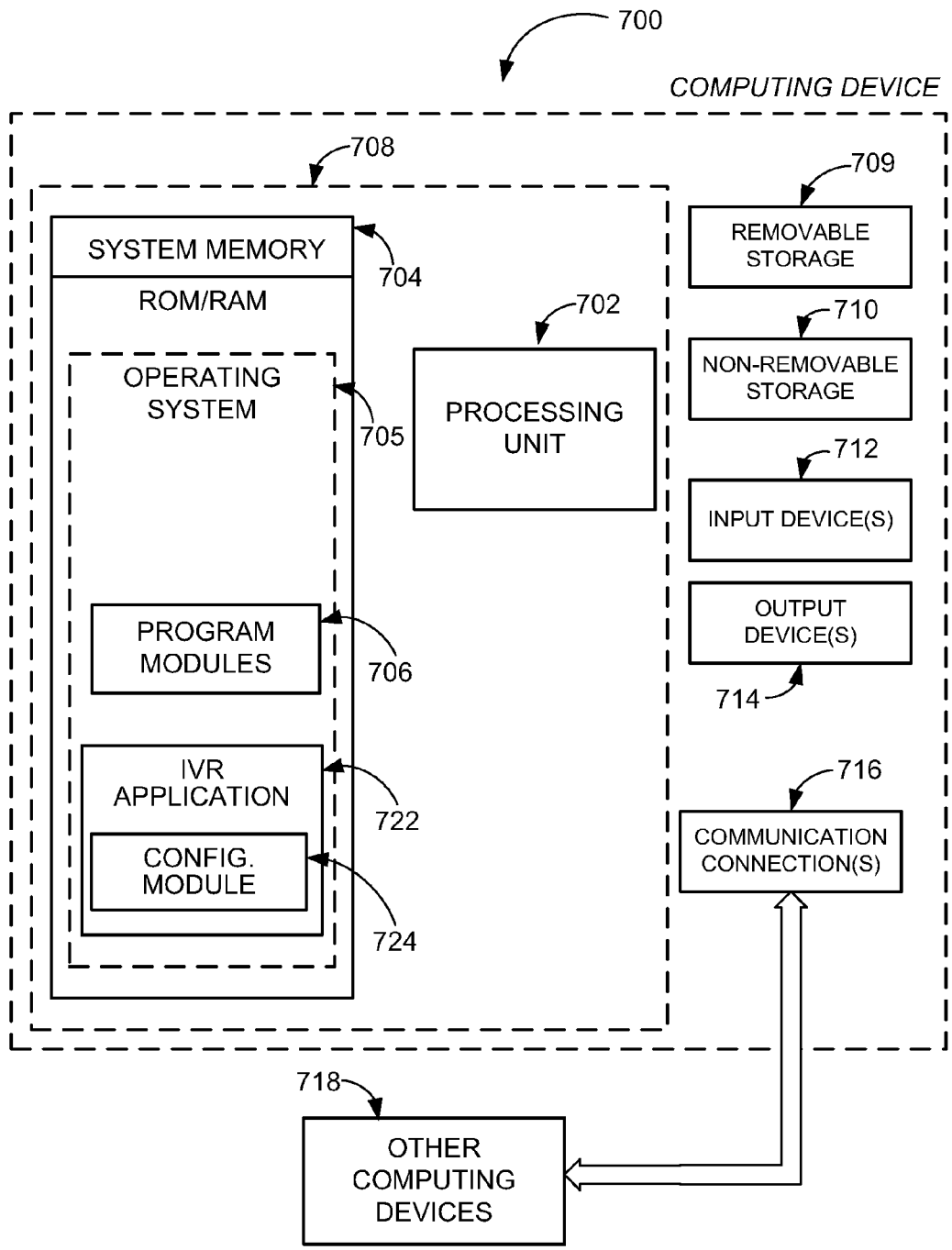
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment for an application according to embodiments is illustrated, such as computing device 700. In a basic configuration, computing device 700 may be a server executing an IVR design application according to embodiments and include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the platform, such as the WINDOWS® operating systems from MICROSOFT CORPORATION of Redmond, Wash. The system memory 704 may also include one or more software applications such as program modules 706, IVR application 722, and configuration module 724.

IVR application 722 may facilitate IVR operations for callers providing answers and/or enabling callers to make choices based on DTMF entries or voice recognition. Configuration module 724 may enable designers to set up the IVR application employing an automatically evolving dynamic form that follows a tree-view structure. IVR application 722 and configuration module 724 may be separate applications or an integral component of a hosted service. This basic configuration is illustrated in FIG. 7 by those components within dashed line 708.

Computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer readable storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 700. Any such computer readable storage media may be part of computing device 700. Computing device 700 may also have input device(s) 712 such as keyboard, mouse, pen, voice input device, touch input device, and comparable input devices. Output device(s) 714 such as a display, speakers, printer, and other types of output devices may also be included. These devices are well known in the art and need not be discussed at length here.

Computing device 700 may also contain communication connections 716 that allow the device to communicate with other devices 718, such as over a wired or wireless network in a distributed computing environment, a satellite link, a cellular link, a short range network, and comparable mechanisms. Other devices 718 may include computer device(s) that execute communication applications, web servers, and comparable devices. Communication connection(s) 716 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
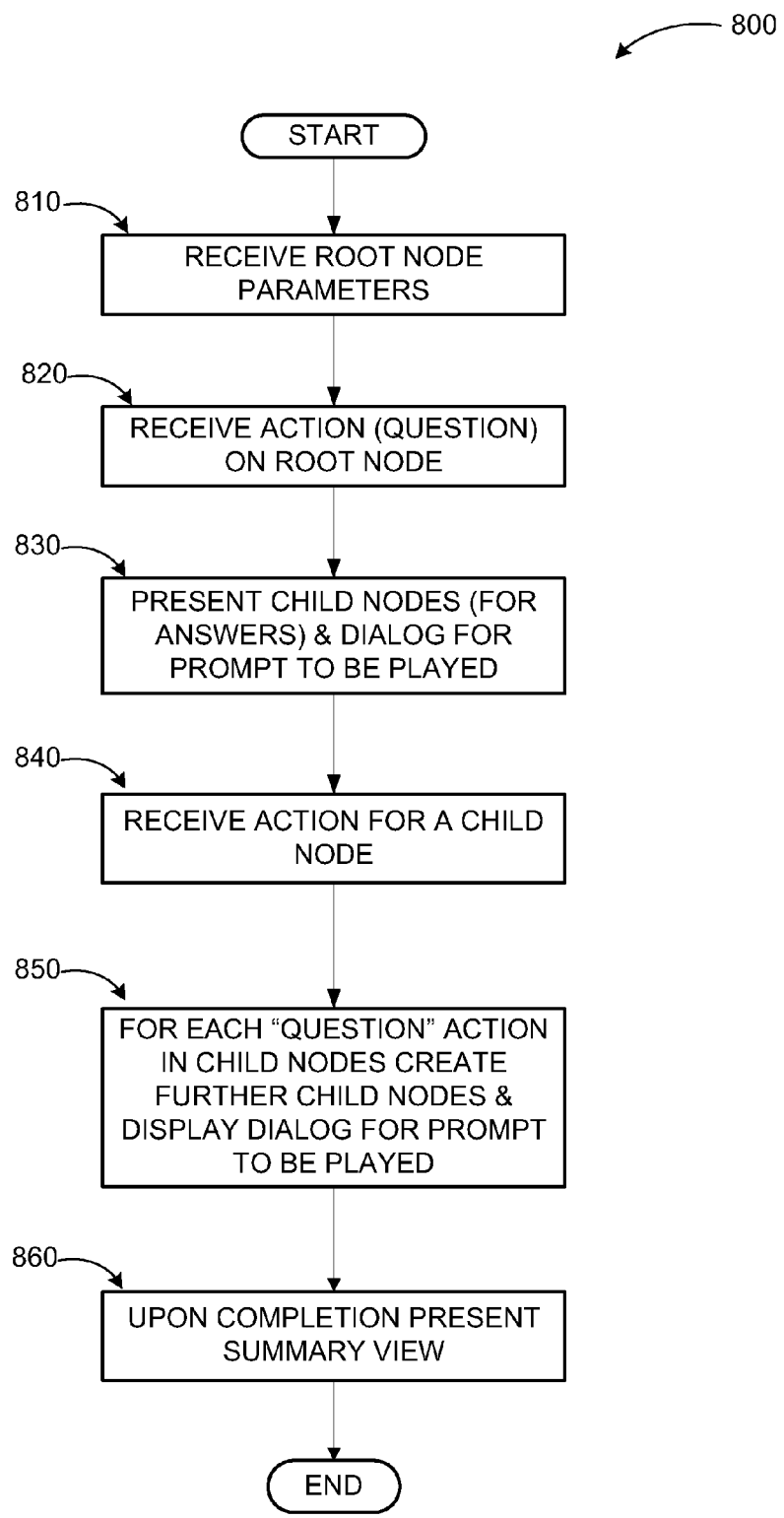
FIG. 8 illustrates a logic flow diagram for a process of designing an IVR system according to embodiments.

FIG. 8 illustrates a logic flow diagram for process 800 of designing an IVR system according to embodiments. Process 800 may be implemented as part of an IVR application executed on a server.

Process 800 begins with operation 810, where parameters and content information associated with the root node of an IVR system are received. The root node typically corresponds to a first message the callers hear when they reach the IVR system and may include an audio prompt (pre-recorded or synthesized) and options for the caller to select using DTMF keypad entry or voice. Alternatively, the root node may also direct callers to a queue or simply play back a prerecorded message. These options may be presented to a designed for selection of the action associated with the root node.

At operation 820, the designer selected action for the root node may be received. if the action is a question prompt, child nodes may be created for possible answers and a form displayed for the designer to specify the prompt associated with the root node at operation 830. Subsequently, a form for specifying an action and a prompt to be played back to callers may be presented for the child nodes at operation 840. Upon receiving an action for a child node from the designer at operation 850, further child nodes may be created for each "question" action and a form displayed as described above at operation 860. Upon completion of designer specification of the branches of the IVR tree, an interactive summary view may be presented enabling the designer to view the hierarchical structure, as well as to modify created nodes.

Thus, in an example scenario according to embodiments, a designer may activate the IVR design application and be presented with tree consisting of the root node. The designer may choose the action of the root node. If the action is a question (if the action on the root node is queuing or playback of a prompt without response options, the process may end there), the form for the root node may present the designer the possibility to enter a prompt. Two answer nodes may also be automatically created below the root node at this step. Next, the designer may enter the prompt, collapse the root node, and expand the first answer node. The designer may then choose the first answer to be triggered based on a DTMF entry ("key response") or when the caller speaking an answer ("voice response"). At this point, the node title/identifier may be changed to the answer associated with the node. The designer may also choose that the action triggered on first answer is a queuing action (e.g. "send to queue SP Medical Issue"). The designer may then collapse the first answer node and expand the second answer node, which may be processed similarly to the first node. When the designer completed the second answer node, two automatic actions may be performed: a third answer node (empty and not mandatory) may be generated below the root node; and two second-level answer nodes (empty and mandatory) may be generated below the second answer.

The operations included in process 800 are for illustration purposes. A process-integrated tree-view control system for IVR design may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for providing process-integrated tree-view control of an interactive voice response (IVR) system design, the method comprising:
   receiving content associated with a root node;
   determining a first level of nodes based on the content of the root node;
   presenting the first level of nodes in a tree-view structure of the IVR;
   in response to receiving a designer selection of one of the first level of nodes, presenting a form within the tree-view structure enabling the designer to provide content for the selected first level node;
   enabling the designer to provide the content through one or more of: a textual entry, a content upload, a first content selection from a directory, and a second content selection from a drop-down menu;
   determining additional sub-level nodes based on designer provided content for the first level nodes;
   automatically creating and presenting the additional sub-level nodes to the designer as unidentified to indicate to the designer that the additional sub-level nodes are selectable; and
   in response to receiving another designer selection of one of the sub-level nodes, presenting another form within the tree-view structure enabling the designer to provide content for the selected sub-level node.

2. The method of claim 1, further comprising:
   upon completion of content entry for the nodes of the tree-view structure, presenting a summary view of the IVR.

3. The method of claim 2, wherein the summary view includes an identification of each node in the tree-view structure and a summary of actions associated with each node, and the method further comprises:
   employing at least one from a set of: a textual scheme, a graphical scheme, a coloring scheme, and a shading scheme to enhance presentation of summary information in the summary view.

4. The method of claim 1, further comprising:
   presenting a plurality of forms at the same time in response to selection of a plurality of nodes by the designer.

5. The method of claim 1, wherein the form enables the designer to provide at least one from a set of: a voice recognition based response associated with the node, a Dual Tone Multi-Frequency (DTMF) key entry by the caller associated with the selected first level node, and an action to be performed when the selected node is reached by a caller.

6. The method of claim 5, wherein the action includes one of: prompting another question to the caller, directing the caller to a queue of agents, directing the caller to a Session Initiation Protocol Universal Resource Identifier (SIP URI), directing the caller to a telephone number, directing the caller to a voicemail, and receiving a complex caller input.

7. The method of claim 5, further comprising:
   determining a number of child nodes to be created under the selected node based on the number of responses;
   creating the child nodes; and
   presenting the child nodes under the selected node within the tree-view structure of the IVR.

8. The method of claim 5, further comprising:
   if the action is prompting another question, enabling the designer to specify the other question through one of: textual entry for conversion to speech, specification of an existing audio file, and uploading of an audio file.

9. The method of claim 5, wherein the designer is enabled to provide the action to performed through a drop-down menu of available actions.

10. The method of claim 1, wherein the designer is enabled to select any node in the tree-view structure for content entry.

11. The method of claim 1, further comprising:
    dynamically collapsing nodes in the tree-view structure to preserve a context of the tree-view structure as new forms are presented.

12. A system for providing process-integrated tree-view control of an interactive voice response (IVR) system design, the system comprising:
    an IVR server for executing an IVR design application, wherein the IVR design application is configured to:
    receive content associated with a root node;
    determine a first level of nodes based on the content of the root node;
    present the first level of nodes in a tree-view structure of the IVR;
    in response to receiving a designer selection of one of the first level of nodes, present a form within the tree-view structure, wherein the form includes a voice response, a key response, and a selectable action associated with the selected node enabling the designer to provide at least one from a set of: a voice recognition based response associated with the node, a Dual Tone Multi-Frequency (DTMF) key entry associated with the node, and an action to be performed when the selected node is reached by a caller;
    in response to the designer selecting an action associated with the selected node that requires one or more expected responses, automatically present one or more sub-level nodes corresponding to each expected response in the tree-view structure of the IVR;
    determine additional sub-level nodes based on designer provided content for the first level nodes;

automatically create and present the additional sub-level nodes;

in response to receiving another designer selection of one of the sub-level nodes, present another form within the tree-view structure enabling the designer to provide content for the selected sub-level node; and upon completion of content entry for the nodes of the tree-view structure, present a summary view of the IVR.

13. The system of claim 12, wherein the nodes are dynamically expanded and collapsed to preserve a context of the tree-view structure for the designer.

14. The system of claim 12, wherein the designer is enabled to access the IVR design application employing at least one from a set of: a laptop computer, a handheld computer, a desktop computer, a vehicle mount computer, and a smart phone through at least one from a set of: a data network, a cellular network, and a Public Switched Telephone Network (PSTN).

15. The system of claim 12, wherein the IVR design application is further configured to provide a user interface to the designer through a browsing application executed on a client device associated with the designer.

16. The system of claim 12, wherein the IVR server is further configured to execute an IVR application presenting prompts to callers and receiving responses from the callers based on the completed tree-view structure via one of: a cellular call, a PSTN call, and a Voice over IP (VoIP) call.

17. A computer-readable storage memory device with instructions stored thereon for providing process-integrated tree-view control design, the instructions comprising:

receiving content associated with a root node;

determining a first level of nodes based on the content of the root node;

presenting the first level of nodes in a tree-view structure of a system;

in response to receiving a designer selection of one of the first level of nodes, presenting a form within the tree-view structure, wherein the form includes a voice response, a key response, and a selectable action associated with the selected node enabling the designer to provide at least one of: an identifier for the selected node and an action to be performed when the selected node is activated;

enabling the designer to provide content associated with the selected node through one or more of: a textual entry, a content upload, a first content selection from a directory, and a second content selection from a drop-down menu;

in response to the designer selecting an action associated with the selected node that requires one or more expected responses, automatically present one or more sub-level nodes corresponding to each expected response in the tree-view structure of the IVR;

determining additional sub-level nodes based on the designer provided content; automatically creating and presenting the additional sub-level nodes to the designer as unidentified to indicate to the designer that the additional sub-level nodes are selectable;

in response to receiving another designer selection of one of the sub-level nodes, dynamically collapsing the selected first level node into the root node and presenting another form within the tree-view structure enabling the designer to provide content for the selected sub-level node;

in response to identifying one or more nodes without designer provided content, marking the one or more nodes invalid; and upon completion of content entry for the nodes of the tree-view structure, presenting a summary view of the system that includes an identification of each node in the tree-view structure and a summary of actions associated with each node.

18. The computer-readable memory device of claim 17, wherein the system is an Interactive Voice Response (IVR) system.

19. The computer-readable memory device of claim 17, wherein summary view includes graphical indication of action types associated with each node in the tree-view structure.

20. The computer-readable memory device of claim 17, wherein the instructions further comprise:

determining allowed actions for each sub-level node; and presenting the allowed actions upon receiving a designer selection of a sub level node.

* * * * *

UNITED STATES PATENT AND TRADEMARK OFFICE
CERTIFICATE OF CORRECTION

PATENT NO.        : 8,717,915 B2                                           Page 1 of 1
APPLICATION NO.   : 12/786856
DATED             : May 6, 2014
INVENTOR(S)       : Frederic Dubut, William LeFevre and Kelly Rollin It is certified that error appears in the above-identified patent and that said Letters Patent is hereby corrected as shown below:

Title page, item (74), should read,

1. Steven Spellman
2. Jim Ross
3. Micky Minhas

Signed and Sealed this
Twenty-second Day of July, 2014

Michelle K. Lee
*Deputy Director of the United States Patent and Trademark Office*